(12) United States Patent
Gellert

(10) Patent No.: US 7,590,484 B2
(45) Date of Patent: Sep. 15, 2009

(54) SAFE RUNWAY AIRCRAFT ARRIVAL AND DEPARTURE SYSTEM USING SPLIT RUNWAY DESIGN

(76) Inventor: Daniel G. Gellert, 110 Ridgetop Pl., Sequim, WA (US) 98382

( * ) Notice: Subject to any disclaimer, the term of this patent is extended or adjusted under 35 U.S.C. 154(b) by 0 days.

(21) Appl. No.: 12/182,962

(22) Filed: Jul. 30, 2008

(65) Prior Publication Data
US 2009/0043487 A1 Feb. 12, 2009

Related U.S. Application Data

(60) Provisional application No. 60/976,646, filed on Oct. 1, 2007, provisional application No. 60/954,276, filed on Aug. 6, 2007.

(51) Int. Cl.
*B64F 1/36* (2006.01)
*G06F 19/00* (2006.01)

(52) U.S. Cl. .................. 701/120; 701/122; 340/959; 244/11 R

(58) Field of Classification Search .............. 701/120, 701/117, 121, 122, 15, 16; 340/959; 244/110 R
See application file for complete search history.

(56) References Cited

U.S. PATENT DOCUMENTS

| | | | | |
|---|---|---|---|---|
| 2,487,613 A | * | 11/1949 | Stone | .................. 244/114 R |
| 3,554,470 A | * | 1/1971 | Dudley | .................. 244/114 R |
| 3,729,153 A | * | 4/1973 | Wilde | .................. 244/114 R |
| 6,131,854 A | * | 10/2000 | Nicolai | .................. 244/114 R |
| 6,282,487 B1 | | 8/2001 | Shiomi | |
| 6,571,167 B2 | | 5/2003 | Schmidt | |
| 7,363,145 B2 | * | 4/2008 | Conner et al. | .................. 701/120 |

* cited by examiner

*Primary Examiner*—Tan Q Nguyen
(74) *Attorney, Agent, or Firm*—Virginia P. Shogren

(57) ABSTRACT

A Safe Runway Aircraft Arrival and Departure System Using Split Runway Design comprising a linear runway divided into separate landing strip and takeoff strip portions. Arriving aircraft land on the designated landing strip portion of the runway, while departing aircraft take off from the designated takeoff strip portion of the runway. The landing and takeoff portions may be separated by a defined buffer zone utilized by aircraft for taxiing to and from a terminal. Existing runways may be readily converted into two designated portions for arriving and departing aircraft, thereby significantly increasing the number of aircraft arrival and departure sequences, reducing the likelihood of aircraft runway incursions, eliminating dangerous intersection takeoffs, and conserving jet fuel.

23 Claims, 2 Drawing Sheets

SAFE RUNWAY AIRCRAFT ARRIVAL AND DEPARTURE SYSTEM USING SPLIT RUNWAY DESIGN

CROSS REFERENCE TO RELATED APPLICATION

This application claims priority under 35 USC 119(e) of Provisional Patent Application Ser. No. 60/954,276 filed Aug. 6, 2007, entitled "System For Increasing Airport Aircraft L/TO Capacity by Utilizing Vertically Separated Approaches (VSA) and Takeoffs (VST) and Provisional Patent Application Ser. No. 60/976,646 filed Oct. 1, 2007, entitled "Advanced Air Traffic Management System Using Split Runway Scheduling and VSA/VST Operations" hereby incorporated by reference in their entirety.

FIELD OF THE INVENTION

The present invention relates generally to improved airport operation, and more particularly to an airport runway system and method of design for converting existing runways into two sections for arriving and departing aircraft, thereby significantly increasing the number of aircraft arrival and departure sequences, reducing the likelihood of aircraft runway incursions, and also conserving jet fuel.

BACKGROUND OF THE INVENTION

Runway designs at airports range from single runways, to two or more parallel runways, to numerous runways facing different directions. For airports with two runways, one runway is typically used solely for takeoffs, while the second runway is used only for landings. If the airport has a single runway, the full length of the runway is used for either a takeoff or a landing ("dual/double mode"). Runway lengths differ depending on the size of the aircraft using the runway. Current designs are intended to accommodate and serve an ever-wider range of aircraft sizes including large wide-body heavy airliners such as the B-747, medium sized airliners such as the EMB-190, business jets, very light jets, and small single and multi-engine private aircraft.

Delayed Arrival and Departure Sequences

Airports world wide are experiencing increased gridlock and associated delays in aircraft arrivals and departures. Airports track the number and time between aircraft arrivals and departures on the runways as "arrival and departure sequences." It is anticipated that air traffic will increase enormously during the coming decades, and with it, will come increased delays between the times aircraft can arrive and depart on the runways, causing delayed arrival and departure sequences. Increased air traffic causes aircraft in the air to be forced into holding patterns, while aircraft on the ground are forced to sit idle on the tarmac or slowly move in a takeoff queue. The delayed arrival and departure sequences directly lead to fuel cost increases, flight time increases, passenger ticket increases, and passenger dissatisfaction. With the increasing traffic comes an increasing need for safety and efficiency of traffic flow.

The detrimental financial impact of the delays is already being felt by the airlines. The United States Department of Transportation recently commenced subsidizing airlines for having to reduce their flight schedules in many of the United States' major airports due to overcrowding.

One approach to meeting the increased delays is through the construction of new, additional runways. The cost of constructing the necessary added runways is estimated to exceed a billion U.S. dollars. Moreover, the construction at many airports will not be possible given rising land costs and growing development around existing airports. Most airports are locked into expensive real estate with homes and businesses nestled on their borders. The land required for new runways is not available for many, if not most, airports.

Increased Risk of Accidents Caused by Runway Incursions and Air Vortices

Given the current and anticipated increase in air traffic world wide, there is a corresponding increase in the risk of airplane accidents caused by runway incursions and air vortices or wake turbulence. When an aircraft enters an active runway due to human and/or equipment error, the aircraft is at risk of causing a collision with another aircraft. Runway incursions are ranked and classed depending on how close the two aircraft come to actually colliding. To date, despite the development of various electronic methods for tracking airplanes while on the runways, no adequate method has been developed to prevent dangerous and potentially deadly runway incursions.

Another safety risk posed by current use of airport runways is takeoffs by smaller aircraft into dangerous air vortices formed by the wake of a preceding larger aircraft's takeoff. These potentially deadly wake turbulences are caused by use of the same runway for takeoffs of both large and small aircraft. In an attempt to address the problem, current FAA regulations require certain distances between aircraft takeoffs for "wake separation". However, whenever a smaller aircraft takes off into the wake of a larger aircraft, there exists the concern for excessive turbulence. In addition, the distance requirements which are meant to render the takeoff safe add more wait time to the aircraft waiting for takeoff clearance.

Skyrocketing Jet Fuel Costs

With rising costs of jet fuel, airlines are in critical need of cutting costs through fuel conservation. Decreased delays in arrival and departure sequences, shorter taxiing times, and less idle waiting on the ground are essential to cutting fuel costs. However, with regard to takeoffs, to date, the size of the aircraft often dictates the type of clearance required (and idling time required) and also determines the taxiing distance to the end of the runway. The typical airliners of the T-category, such as the B-737, A-320 and those larger in size, are required to have dispatch clearance (prior authorization from a dispatcher for takeoff) and balanced runway lengths (a prescribed runway distance for takeoff to allow the aircraft to abort the takeoff if necessary) before taking off. As a result, the aircraft must be positioned at a point on the runway that allows sufficient runway for the aircraft to abort the takeoff if necessary. These factors add significant time, delay, and added fuel costs to the aircraft's operation.

With long lines, late flights, and near collisions, there is significant dissatisfaction with the U.S. air travel system, and the FAA is seemingly helpless to improve the system. FAA officials estimate that the overcrowded conditions will cost the American economy $22 billion annually within the next decade. Physically getting the airplanes out of the airports is becoming a serious problem, with some controllers reporting 4.5 mile long taxi lines at major airports.

Accordingly, there is a critical but as of yet un-met need in the art for an airport runway system using existing runways that increases the number and efficiency of aircraft arrival and departure sequences, that increases aircraft safety by both reducing the likelihood of aircraft runway incursions and reducing the likelihood of accidents caused by air vortices formed by larger aircraft, and which reduces taxiing and idle wait times to conserve jet fuel.

SUMMARY OF THE INVENTION

The inventive Safe Runway Aircraft Arrival and Departure System Using Split Runway Design of this application utilizes existing runways that have been converted into separate portions comprising a landing strip and a takeoff strip. An arriving aircraft lands on the designated landing strip portion of the runway, and a departing aircraft takes off from the designated takeoff strip portion of the runway. The landing and takeoff portions of the split runway may be of equal lengths, differing lengths, and/or may be separated by a defined buffer zone. The buffer zone may be utilized by aircraft taxiing to and from an airport terminal, thereby allowing the aircraft to access other runways at further distances from the terminal in a safe, efficient and fuel-saving manner.

This invention provides for a single (same) runway to be split into two linear runways from pre-existing runways with an innovative dedicated cross runway taxiway between takeoff and landing strip portions. The cross runway taxiway (buffer zone) is utilized by aircraft accessing a second runway parallel to the split runway. In this manner, the second runway aircraft may taxi laterally across the split runway to access the second runway located at a further distance from the terminal. The dedicated cross runway taxiway located between the takeoff and landing portions of the split runway allows aircraft to cross the runway and reach runways at a further distance from the terminal in a safe, efficient, and fuel-saving manner. The physical dedication of the buffer zone eliminates runway incursions. This innovative system further allows aircraft to be deiced immediately prior to departure and takeoff and within the safe time period for the usefulness of the deicing fluids.

The invention further comprises a method of operating an airport having a terminal and a split runway and a method of airport runway design comprising converting existing runways into split runways allowing for both landings and takeoffs.

BRIEF DESCRIPTION OF THE DRAWINGS

The invention is described in more detail with reference to the attached drawings, in which.

DETAILED DESCRIPTION OF THE ILLUSTRATIVE EMBODIMENT:

The following detailed description illustrates the invention by way of example, not by way of limitation of the scope, equivalents or principles of the invention. This description will enable one skilled in the art to make and use the invention, and describes several embodiments, adaptations, variations, alternatives and uses of the invention.

Safe Runway Aircraft Arrival and Departure System Using Split Runway Design

Figure 1:
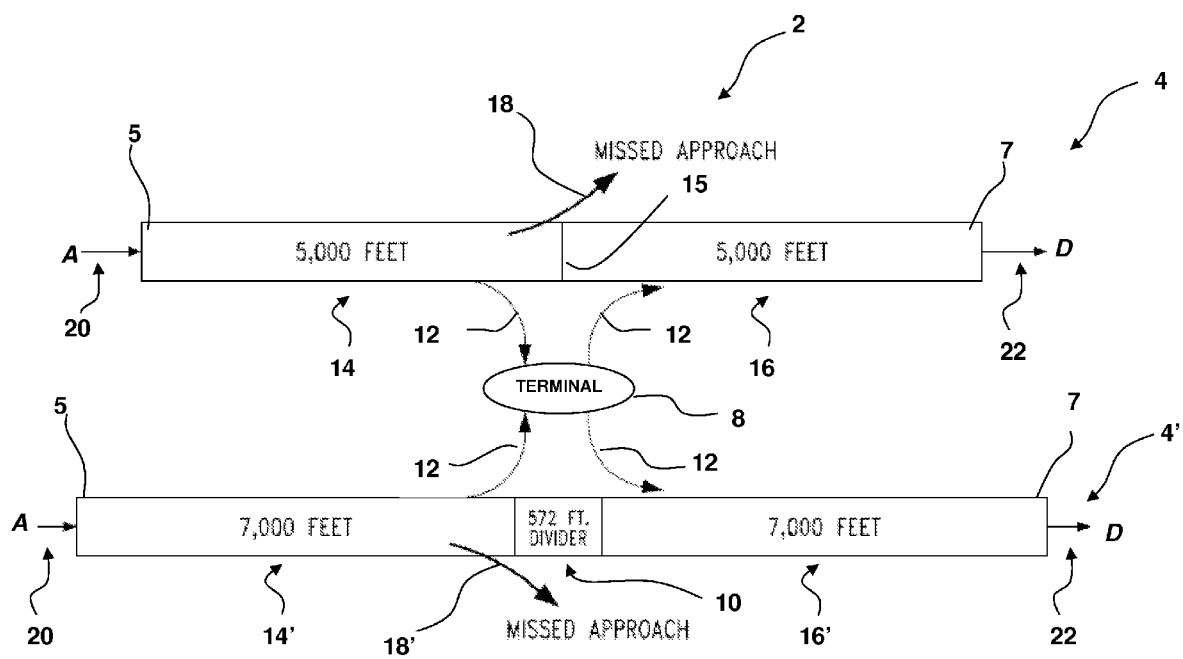
FIG. 1 is a top plan view diagram of an exemplary airport with terminal, two split runways, a buffer zone, and designated missed approach flight paths, according to the invention; and, FIG. 2 is a top plan view diagram of an exemplary airport with terminal, four runways, two of which are split runways, and dual buffer zones, according to the invention.

FIG. 1 shows an exemplary Safe Runway Aircraft Arrival and Departure System Using Split Runway Design 2 with airport terminal 8, two split runways 4, 4', a buffer zone 10, and designated missed approach flight paths 18, 18'. The shorter split runway 4 is an existing linear runway 10,000 feet long divided medially between opposed first and second ends 5, 7 into two equal portions, a landing strip 14 5,000 feet long and a takeoff strip 16 5,000 feet long. A dividing line 15 separates the landing 14 and takeoff strips 16. The line 15 is a painted strip crossing the width of the runway surface sufficiently wide to be visible to pilots and other personnel involved in the airport's operations. Any other or additional suitable or desirable markers, lighting systems, signals and the like, or combination thereof, may be utilized to mark the separation between the landing 14 and takeoff 16 strips of the split runway 4.

Referring to the top split runway 4 of FIG. 1, directional arrow "A" 20 at the left of the runway 4 shows the direction of an arriving aircraft (not shown) landing onto the landing strip 14. Likewise, directional arrow "D" 22 at the right of the runway 4 shows the direction of a departing aircraft (not shown) taking off from the takeoff strip 16. The system 2 allows for simultaneous landings on the approach end of a runway 20, while the far half is used for takeoff by departing aircraft 22.

Figure 2:
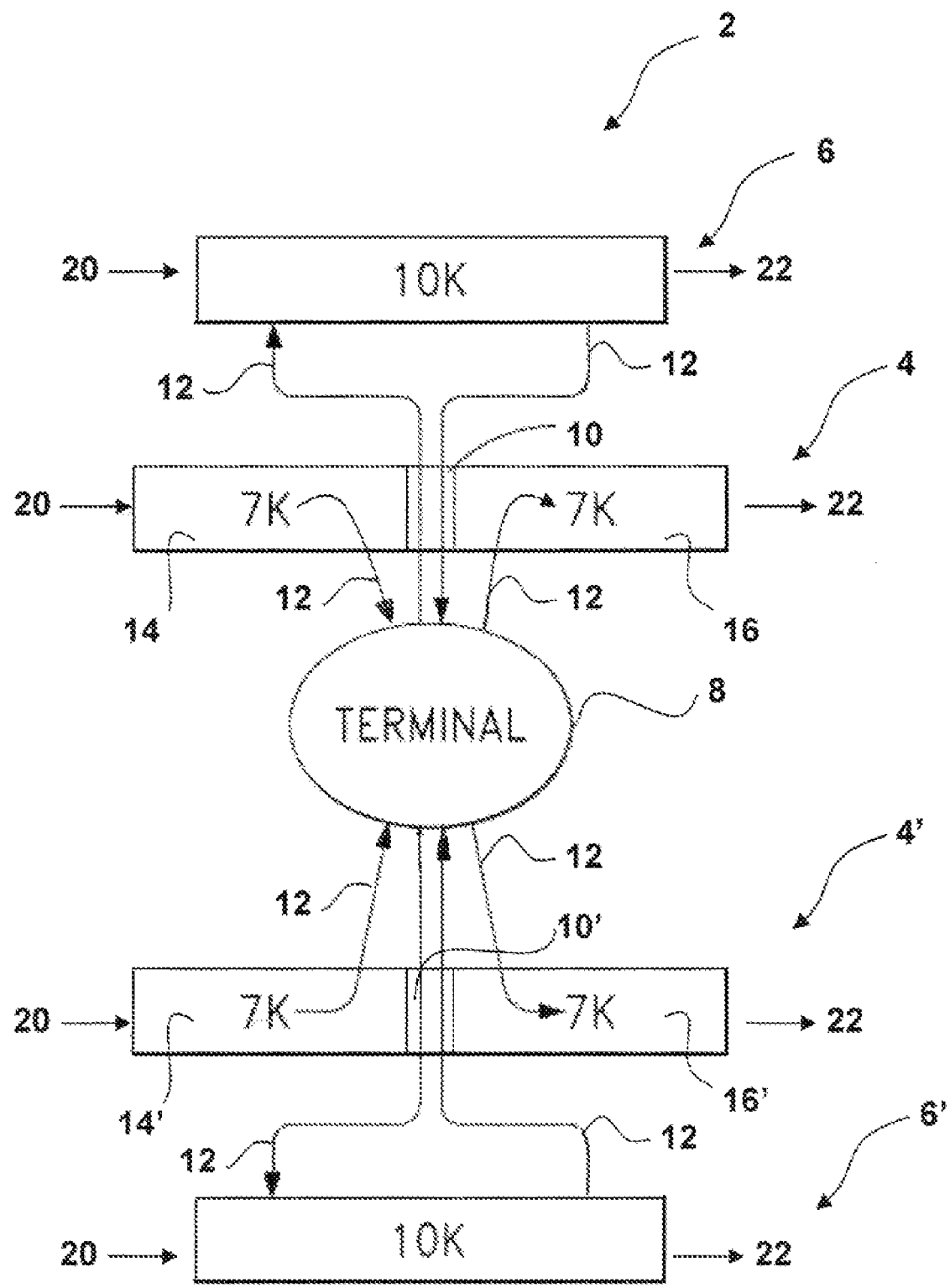

Referring to FIG. 1, the second linear split runway 4' is longer than the first split runway 4 and is divided into a landing strip 14 of 7,000 feet and a takeoff strip 16 of 7,000 feet. A central buffer zone 10, comprising a defined length of the split runway 4' between the landing 14 and takeoff 16 strips divides the two portions. The buffer zone 10 of FIG. 1 is 572 feet long. As shown in FIG. 2, the buffer zone 10 may be utilized for efficient and safe taxiing of aircraft to and from the terminal 8 and outer runways.

The buffer zone as shown in FIG. 1 provides additional taxiing space for the aircraft between the landing 14 and takeoff 16 strips for added safety and decreased risk of runway incursions. The buffer zone 10 may be of any suitable or desired width. The buffer zone 10 is visually separated from the remainder of the split runway 4' by a pair of opposed, spaced, painted strips crossing the width of the runway surface and sufficiently wide to be visible to pilots and other personnel involved in the airport's operations. Any other or additional suitable or desirable markers, lighting systems, signals and the like, or combination thereof, may be utilized to mark the boundaries and/or the defined space of the buffer zone 10.

Referring to FIG. 1, exemplary taxiing paths 12 for aircraft are shown between the split runways 4, 4' and the terminal 8. Arrows 12 directed at the terminal 8 represent aircraft taxiing from the landing strip 14 portions of the runways 4, 4' to the terminal 8 upon arrival; arrows 12 directed away form the terminal 8 represent aircraft taxiing to the takeoff strip 16 portions of the runways 4, 4' for departure.

Exemplary defined paths of airspace for missed approaches 18, 18' are shown aimed away from the takeoff strips 16 and terminal 8. The missed approach paths 18, 18' take the air traffic away from the takeoff strips 16, thereby reducing the risk of collision with departing aircraft.

While the landing 14, 14' and takeoff 16, 16' strip portions of the split runways 4, 4' of FIG. 1 are shown as equal in length, it should be understood that the portions may be of differing lengths. In addition, while the buffer zone 10 of FIG. 1 is shown equidistant between the first and second ends 5, 7 of the runway 4', it should be understood that the buffer zone 10 may be located at other positions along the length of the runway 4' such as in the case where the landing strip 14 and takeoff strip 16 are of differing lengths. Finally, while the direction of landing 20 and direction of takeoffs 22 are shown from left to right in FIG. 1, it should be understood that the direction may be reversed (from right to left) provided the landing strip portion 14 comes before (upstream of) the takeoff strip portion 16.

Referring to FIG. 1, to further enhance the safety aspects of the system 2, the two split runways 4, 4' may be designated for use by different types of aircraft with a range of weights. For example, the shorter split runway 4 may be designated for aircraft of lower weight, whereas the longer split runway 4' may be designated for aircraft of heavier weight. The smaller aircraft (having a lower weight) may safely land and takeoff from the shorter strips 14, 16 of 5,000 feet in length, whereas the larger aircraft (of heavier weight) may safely land and takeoff from the longer strips 14', 16' of 7,000 feet in length. Keeping the smaller aircraft separated from the heavier aircraft by using separate split runways 4, 4' greatly reduces, if not eliminates, the risk of accidents caused by smaller aircraft taking off into the wake of a larger aircraft. Thus, at airports having two parallel runways such as shown in FIG. 1, the heavy airliners may be separated from the non-heavy airliners. The additional distances which are presently required for wake separation may be reevaluated and in some instances greatly reduced to provide additional benefits of less idling time on the ground, a decrease in the time period of flight, and the corresponding benefit in reduced fuel consumption. The approach is consistent with the "every little bit helps" principle now used by all airlines and regulators to increase sequences and to save fuel.

FIG. 2 shows an exemplary Safe Runway Aircraft Arrival and Departure System Using Split Runway Design 2 with terminal 8, two split runways 4, 4', two dual mode runways 6, 6', and dual buffer zones 10, 10'. The split runways 4, 4' have landing 14, 14' and takeoff strips 16, 16' of equal lengths (7,000 feet) with central buffer zones 10, 10'. The dual mode runways 6, 6' are each 10,000 feet long and are used for both landings and takeoffs and are not split.

Directional arrows 20 at the left of the runways 4, 4', 6, 6' show the direction of an aircraft (not shown) landing. Likewise, directional arrows 22 at the right of the runways 4, 4', 6, 6' show the direction of an aircraft (not shown) taking off. The split runways 4, 4' of the system 2 allow for close to simultaneous, if not actual simultaneous, landings and takeoffs from the split portions 14, 14', 16, 16' of the respective split runways 4, 4'. These sequences are permissible under existing Federal Aviation Regulations. FAA Regulation 3-131 allows for jet airliners to be separated by a 6,000 foot distance between landing and takeoff traffic using the same runway.

Referring to FIG. 2, the terminal 8 is centrally located within the system 2 and is readily accessible by taxiing aircraft via the buffer zones 10, 10'. Exemplary taxiing paths 12 for aircraft are shown both between the split runways 4, 4' and the terminal 8, on one hand, and between the dual mode runways 6, 6' and the terminal 8, on the other hand. Historically up to the present time, if an airport utilizes two parallel runways, pilots are required to stop an aircraft while waiting for Air Traffic Clearance until the runway needed to be crossed is cleared of takeoff and landing traffic. Such clearance and associated delays are avoided by designating the buffer zones 10, 10' of the inventive system 2. The system 2 provides not only a direct short distance for aircraft from the terminal 8 to the takeoff strips 16, 16' for departure, but also a short taxi distance to arriving aircraft on the landing strips 14, 14' to reach the terminal 8. The dedicated crossing taxiway through the buffer zones 10, 10' from the outside (further-from-the-terminal) dual mode runways 6, 6' directly to and from the terminal 8 greatly reduce the risk of runway incursions and further save time and fuel.

The system 2 may further include a traffic controller to direct the air traffic utilizing the system 2 in an efficient, safe manner; and/or electronic means for determining an arrival and departure sequence of the arriving and departing aircraft that is desirable from a safety perspective and/or maximizes the arrival and departing sequences for the system 2.

Method of Airport Runway Design

A method of airport runway design comprises converting an existing runway having a defined length into a split runway, said split runway comprising a landing portion and a takeoff portion. The method may further comprise the steps of visually designating a section of the length of the runway as a buffer zone between the landing and takeoff portions; lengthening an existing runway prior to splitting it into landing and takeoff portions; and/or converting a first existing runway into a split runway designated for aircraft having a lower weight, and converting a second existing runway into a split runway designated for aircraft having a heavier weight.

Longer than required runway length is a waste of needed resources. To maximize and provide the best runway utilization benefit to aviation, many existing runways, and many other runways with added length can be safely split into two portions, one utilized for takeoff, the other for landing, with a safe dedicated buffer zone taxiway between the two portions.

A significant advantage of the Safe Runway Aircraft Arrival and Departure System Using Split Runway Design of this application is its potential for rapid implementation at relatively low cost. Instead of building entire new runways (even assuming such modifications are possible), this innovative system stays within most present airport boundaries by using accepted parallel runway systems (an example of which is shown in FIG. 2) as opposed to linear runways built end to end. Relatively basic modifications may be made to the ground-based airport equipment, such as lengthening of some runways, installing runway taxi lights and markings to create the independent split runways and any buffer zones, and otherwise modifying existing airport facilities to meet all federal, state and local rules and regulations. This invention further avoids and eliminates the added expense and safety problems associated with multiple parallel runways feeding into one taxiway, and the potential doubling of airport perimeter areas for linear runways built end to end with a taxiway connecting them.

For example, in lieu of constructing additional runways, the parallel runways at New York's JFK Airport, which have lengths of 14,572 feet, could rapidly and inexpensively be split into two, 7,000 feet long independent runways for B-737 and A-320 type airliners, with a 572 feet wide buffer zone separating the two fully functional independent runways so created. The FAA already has approved 7,000 feet long runways for "heavy" wide-body jumbo jet airliners, such as the L-1011, at LaGuardia Airport indicating and proving that such length is not only safe for "heavy" airliners, but is also more than sufficient for "large" and smaller aircraft.

In the preferred embodiment, the system is adopted by multiple airports, such as all airports in a particular country, for consistency within the overall air transportation system. Each implementation of the system must take into consideration the type of facility used for approaches, the missed approach procedure, the required length of one or more split runways necessary for the type of aircraft using the airport, the airport's altitude, and any other operational and regulatory limiting factors within the high safety requirements demanded in aviation.

Method of Operating an Airport Using System

A method of operating an airport having a terminal and a split runway comprises the steps of: 1) permitting an arriving aircraft to land on the landing strip portion of the split runway; and 2) permitting a departing aircraft to depart from the takeoff strip portion of the split runway. The method may further comprise use of a buffer zone between the landing and takeoff strip portions for taxiing to and from the terminal.

The safe runway design of the present invention provides for operating an airport with additional aircraft sequences for both arriving (landing) and departing (taking off) aircraft for most of the world's international and domestic airports. The sequencing of "heavy" (A-380, B-747) type airliners for one period, then for another period splitting the runway for "large" (B-737, A-320) and "medium" (EMB-190) type airliners may be the most optimal runway use and sequence utilization in certain airports. Other desirable or effective sequencing patterns may be determined and utilized depending on the particular airport and aircraft being flown. For example, on occasions when more takeoffs than landings of aircraft are required, both parts of the split runway can be utilized for takeoffs. In this mode of operation, a first departing aircraft takes off from the landing strip portion of the runway, and a second departing aircraft takes off from the take-off strip portion of the runway. By having the subsequent aircraft climb to a higher altitude, especially if the following (subsequent) aircraft is slower than the preceding aircraft, departure sequences can be increased and maximized.

Other possible modes of operation include: 1) having all landings on split runways be made by the captain of the flight; 2) configuring the aircraft for landing prior to crossing the final approach fix ("FAF"); 3) achieving proper communication in the tower radio frequency and receiving clearance to land prior to beginning the descent for landing and crossing the FAF; 4) imposing protocols requiring that if any of the preceding conditions are not fully met, an automatic missed approach is initiated no later than crossing the FAF; 5) providing the split runway full length to any aircraft so requesting it; and/or, 7) making the split runway immediately usable at full length in an emergency.

Airports and regulatory agencies already allow for intersection takeoffs for small to medium sized aircraft since long runways are not required for their use. These intersection takeoffs present a danger and can lead to accidents for reasons including departing aircraft entering portions of a runway used by landing aircraft. In contrast, the present invention allows for takeoffs only from the designated takeoff portion of a split runway without any overlap into portions of a runway used for landings. In addition, the takeoff portion of the split runway may be used not only by smaller aircraft, but also by larger, heavier T-category aircraft requiring a dispatch release. Finally, as an additional safety feature, specialized marking systems, including landing lights and runway markers, may be designed to be switched on (made visually apparent) for a split runway, and turned off (rendered non-visible) to return the runway to full length if necessary or desired.

Introduction of the system 2 in operation may be conducted in phases. Initial training of Air Traffic Control personnel, pilots, and all parties associated with the system would build a satisfactory confidence level. These persons will need time to study the system, build expertise, and build confidence required for safe and continued daily operations. Once this is achieved, the system 2 may be introduced in the following exemplary phases:

Phase 1: hold departing aircraft from taking position on the takeoff strip portion of the split runway until after arriving aircraft has landed and is in position to turn off the landing strip portion.

Phase 2: hold departing aircraft from taking off until arriving aircraft has the landing assured.

Phase 3: permit close to simultaneous or simultaneous landings and departures as determined by ATC and pilot decisions. A short delay may be used to accommodate safety as viewed by the ATC and flight crews, referred to in the industry as a "hedge factor."

The implementation phases described herein are exemplary only. Any suitable or desired phased introduction of the system 2 may be utilized.

Increased Safety Aspects

The 9/11 Report on the terrorist attacks on Sep. 11, 2001 involving the U.S. airliner industry identified a failure of imagination as the most significant failure associated with allowing the terrorism of that day to take place. Consistent with the urgings of the 9/11 Report, it is imaginable that long lines of airlines lined up on taxiways close to perimeter fences while waiting for takeoff could potentially become a target for terrorist attacks. A simultaneous attack on the first and last airliners in the queue would leave many airliners unable to escape a continuing attack. The runway system of the present invention eliminates the need for long lines of airliners waiting to take off, and is a safer system from the terrorism perspective.

Another increased safety aspect of the present invention involves de-icing of aircraft. De-icing of departing aircraft is one of the most dangerous, expensive and disruptive operations during winter and in colder climates. A lack of available de-icing equipment may delay departure until the weather closes down an airport, thereby requiring repeated de-icing operations often without the benefit of an aircraft leaving the airport. In connection with a Safe Runway Aircraft Arrival and Departure System Using Split Runway Design of the present application, de-icing is conducted in a systematic and planned way. The method comprises the steps of: 1) de-icing a first airliner in a departure sequence; 2) taxiing of the first airliner efficiently and quickly to a split runway takeoff point; 3) allowing immediate departure of the first airliner for a safer take off without additional build up of dangerous levels of heavy ice due to the passage of time; and, 4) repeating the steps for each of the next airliners in a departing sequence.

Finally, the split runway design provides for continuous service during or following a major snow storm or when there is otherwise an obstruction on a portion of the runway. The landing strip portion or the takeoff strip portion of the split runway may be cleared of snow or other obstruction allowing for continued use of the split runway. For example, a 7,000 foot portion of the runway may be cleared of snow and used, as opposed to clearing and keeping open a total runway length (such as the entire 14,572 foot long runway at JFK Airport).

INDUSTRIAL APPLICABILITY

The inventive Safe Runway Aircraft Arrival and Departure System Using Split Runway Design of this application has wide applicability to the fields of air traffic procedure and science, aircraft movement, airline and airport operations, aviation safety, transportation management, and airport operations. The invention is applicable to any airline or operator of an airport desiring to increase airport takeoff and landing sequences, while saving jet fuel and preventing dangerous runway incursions and intersection takeoffs. The system unlocks existing unused and underused runway capacity for better utilization, increased safety, and reduced fuel costs. Providing two separate and independent runways from longer than required runways doubles runway usage. Splitting runways in half for those aircraft not requiring long runways provides the benefits of increased flight operations (as many as would be accommodated by the construction of a completely new additional runway), reduced taxi distances, reduced fuel costs, and reduced wear and tear on aircraft, taxiway and runway facilities.

It should be understood that various modifications within the scope of this invention can be made by one of ordinary skill in the art without departing from the spirit thereof and without undue experimentation, including additional features required by the regulating authority and/or airport operators. For example, jet blast deflectors operated hydraulically or through other mechanical or electrical means can be designed and placed into the appropriate runway location during split runway operations and lowered for full runway operations. As another example, aircraft barrier or barricades also can be provided at the end of the split runway during split runway operation, raised and lowered by mechanical, hydraulic, electrical or other means if so required.

This invention is therefore to be defined as broadly as the prior art will permit, and in view of the specification if need be, including a full range of current and future equivalents thereof.

I claim:

1. An aircraft arrival and departure system comprising:
   a pre-existing single continuously linear first runway converted into a linear split runway comprising a landing strip portion, a takeoff strip portion, and a cross taxi-way or buffer zone between the landing and takeoff strip portions;
   a pre-existing continuously linear second runway spaced apart from the split runway and positioned parallel to the first runway,
   a split runway arriving aircraft;
   a split runway departing aircraft;
   a second runway aircraft;
   a terminal;
   wherein said split runway arriving aircraft lands on the landing strip portion of the split runway, said split runway departing aircraft departs from the takeoff strip portion of the split runway; and wherein said cross taxiway is utilized by the second runway aircraft to taxi laterally across the first runway to access or depart from the second runway located at a further distance from the terminal.

2. The system of claim 1, wherein the landing strip portion and the takeoff strip portion are of equal lengths.

3. The system of claim 1, wherein the landing strip portion and the takeoff strip portion are of differing lengths.

4. The system of claim 1, further comprising a cross runway taxiway, said taxiway comprising a defined length of the split runway between the landing and takeoff portions.

5. The system of claim 1, wherein the cross taxiway comprises a defined length of the split runway intermediate to the landing and takeoff strip portions.

6. The system of claim 1, further comprising a cross taxiway utilized by the arriving and departing aircraft to taxi to and from the terminal.

7. The system of claim 1, wherein the first runway is alternately used as a dual mode runway.

8. The system of claim 1, further comprising a traffic controller.

9. The system of claim 1, further comprising electronic means for determining an arrival and departure sequence of the aircraft.

10. The system of claim 1, further comprising a defined path of airspace for a missed approach.

11. The system of claim 1, wherein the landing strip and takeoff strip portions are designated for aircraft having a lower weight.

12. The system of claim 1, wherein the landing strip and takeoff strip portions are designated for aircraft having a heavier weight.

13. The system of claim 1, further comprising a first split runway designated for aircraft having a lower weight and a second split runway designated for aircraft having a heavier weight.

14. A method of converting an existing airport having existing continuously linear parallel spaced first and second runways into a split runway airport, the method comprising the steps of:
   converting the first runway into a split runway by designating a landing strip portion, a takeoff strip portion, and a cross taxiway portion between the landing strip and takeoff strip portions;
   allowing an arriving aircraft to land on the landing strip portion of the split runway;
   allowing a departing aircraft to depart from the takeoff strip portion of the split runway; and
   allowing an aircraft accessing or departing the second runway to taxi laterally across the first split runway via the cross taxiway.

15. The method of claim 14, further comprising the step of visually designating the cross taxiway by installing spaced markers positioned laterally across the split runway, said markers capable of being rendered visually apparent to differentiate the landing and takeoff strip portions of the split runway, on the one hand, and capable of being rendered non-visible to return the split runway to an original full length, on the other hand.

16. The method of claim 14, further comprising the step of lengthening the first runway prior to splitting the first runway into the landing strip and takeoff strip portions.

17. The method of claim 14, further comprising the steps of assigning aircraft having a lower weight to the split runway, and assigning aircraft having a heavier weight to the second runway.

18. A method of operating an airport having a terminal and a split runway, said split runway comprising a landing strip portion, a takeoff strip portion, and a cross taxiway portion between the landing strip and takeoff strip portions, said method comprising the steps of:
   permitting an arriving aircraft to land on the landing strip portion;
   permitting a departing aircraft to depart from the takeoff strip portion; and
   permitting an aircraft accessing or departing a second runway located at a further distance from the terminal to taxi laterally across the first runway via the cross taxiway.

19. The method of claim 18, wherein the split runway further comprises a cross taxiway, said taxiway comprising a defined length of the split runway between the landing strip and takeoff strip portions, and the method further comprises the step of accessing the cross taxiway by the arriving and departing aircraft to taxi to and from the terminal.

20. The method of claim 18, wherein the arriving aircraft and departing aircraft are permitted to land and takeoff simultaneously.

21. The method of claim 18, wherein a first departing aircraft takes off from the landing strip portion of the split runway, and a second departing aircraft takes off from the take-off strip portion of the split runway.

22. The method of claim 18, further comprising the steps of:
   de-icing a first airliner in a departure sequence;
   taxiing of the first airliner to the split runway takeoff strip;
   allowing immediate departure of the first airliner; and, repeating the steps for each of a departing airliner in the departure sequence.

23. The method of claim 18, wherein the landing strip portion or the takeoff strip portion of the split runway is cleared of snow or other obstruction allowing for continued use of a portion of the split runway.

* * * * *